(12) United States Patent
Sampayan et al.

(10) Patent No.: US 12,525,789 B2
(45) Date of Patent: Jan. 13, 2026

(54) POWER GRID PROTECTION

(71) Applicants: Lawrence Livermore National Security, LLC, Livermore, CA (US); Opcondys, Inc., Manteca, CA (US)

(72) Inventors: Stephen E. Sampayan, Manteca, CA (US); Kristin C. Sampayan, Manteca, CA (US)

(73) Assignees: Lawrence Livermore National Security, LLC, Livermore, CA (US); Opcondys, Inc., Manteca, CA (US)

( * ) Notice: Subject to any disclaimer, the term of this patent is extended or adjusted under 35 U.S.C. 154(b) by 163 days.

(21) Appl. No.: 18/485,079

(22) Filed: Oct. 11, 2023

(65) Prior Publication Data

US 2024/0128742 A1    Apr. 18, 2024

Related U.S. Application Data

(60) Provisional application No. 63/415,596, filed on Oct. 12, 2022.

(51) Int. Cl.
*H02H 9/00* (2006.01)
*H02H 1/00* (2006.01)
(52) U.S. Cl.
CPC .......... *H02H 9/005* (2013.01); *H02H 1/0007* (2013.01)
(58) Field of Classification Search
CPC .............................. H02H 9/005; H02H 1/0007
USPC ........................................................... 361/86
See application file for complete search history.

(56) References Cited

U.S. PATENT DOCUMENTS

| 4,970,623 A | * | 11/1990 | Pintar | H01H 47/001 |
| | | | | 361/186 |
| 2001/0036048 A1 | * | 11/2001 | Goto | H02H 3/33 |
| | | | | 361/42 |
| 2008/0123239 A1 | * | 5/2008 | Wilson | H02H 9/06 |
| | | | | 361/111 |
| 2011/0222194 A1 | * | 9/2011 | Kinsel | H02H 3/335 |
| | | | | 324/509 |
| 2011/0279942 A1 | * | 11/2011 | Bishop | G01R 15/183 |
| | | | | 361/93.6 |

(Continued)

FOREIGN PATENT DOCUMENTS

JP          2024029471 A   *  3/2024
WO   WO-2013172900 A2  * 11/2013   ......... H01S 5/06223

OTHER PUBLICATIONS

B. R. Poole, "Simulating the Coupling of High Frequency Transients to Power Grid Transmission Lines," presented at COMSOL Days Presentation, May 16, 2018.

*Primary Examiner* — Dharti H Patel
(74) *Attorney, Agent, or Firm* — Perkins Coie LLP

(57) ABSTRACT

Devices, methods and techniques related to the suppression of electrical transients are disclosed. In one example aspect, an electrical transient protection device includes a sensor configured to monitor power transmission on a transmission line of a power system, a controller configured to generate a control signal in response to a detection of one or more electrical transients by the sensor, and a controller transient suppression unit comprising at least a switch that exhibits a changeable impedance. The controllable transient suppression unit configured to impose a load to the power system. The load has a substantially same impedance as a characteristic impedance associated with a part of the power system.

18 Claims, 14 Drawing Sheets

(56) References Cited

U.S. PATENT DOCUMENTS

2023/0108660 A1* 4/2023 Bradley ............... G01R 31/001
                                                        361/91.6

* cited by examiner

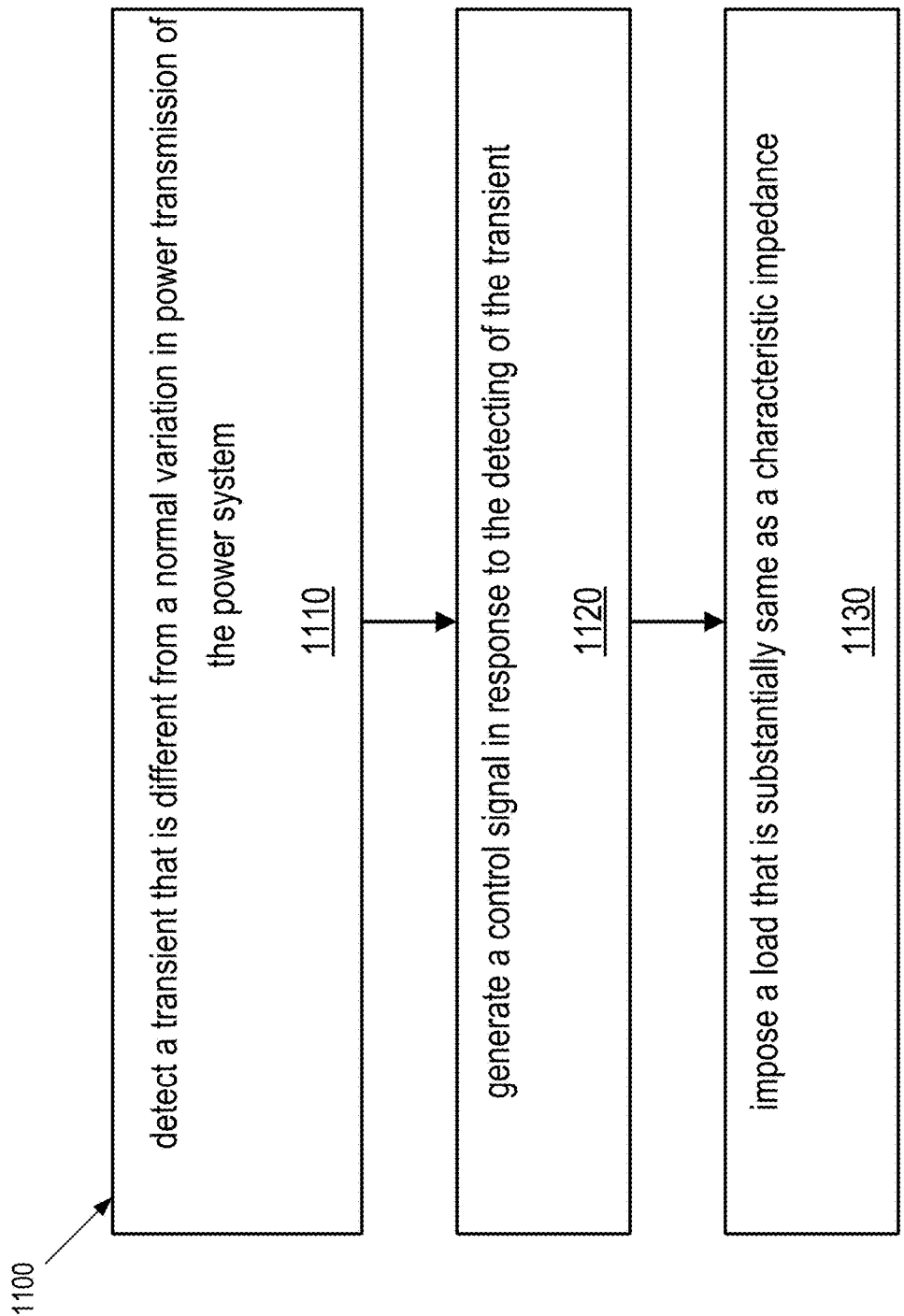

POWER GRID PROTECTION

CROSS REFERENCE TO RELATED APPLICATIONS

This patent document claims priority to and benefits of U.S. Provisional Patent Application No. 63/415,596 entitled "Method and Means of Ultrafast Grid Protection" and filed on Oct. 12, 2022. The entire contents of the before-mentioned patent application are incorporated by reference as part of the disclosure of this patent document.

STATEMENT REGARDING FEDERALLY SPONSORED RESEARCH OR DEVELOPMENT

This invention was made with Government support under Contract No. DE-AC52-07NA27344 awarded by the United States Department of Energy and under Contract No. DEAR0000907 awarded by the Advanced Research Projects Agency-Energy (ARPA-E). The Government has certain rights in the invention.

TECHNICAL FIELD

This document generally relates to power grid protection, and more specifically, the suppression of ultrafast electrical transients in power grids.

BACKGROUND

A power line transient, also referred to as an electrical transient, is a temporary sudden change in voltage and/or current on a power system that can disturb or damage the components of the system. The power line transients are characterized as fast destructive high voltages that drive large amounts of current for a few 10s of nanoseconds to several milliseconds.

SUMMARY

Devices, methods and techniques related to the suppression of electrical transients are disclosed.

In one example aspect, an electrical transient protection device includes a sensor configured to monitor power transmission on a transmission line of a power system, a controller configured to generate a control signal in response to a detection of one or more electrical transients by the sensor, and a controllable transient suppression unit comprising at least a switch. The controllable transient suppression unit is configured to impose a load to the power system. The load has substantially the same impedance as a characteristic impedance associated with a part of the power system.

In another example aspect, a method for protecting against electrical transients includes detecting, by a sensor coupled to a transmission line of a power system, one or more electrical transients that are different from a normal variation in power transmission of the power system; generating, by a controller that is coupled to the sensor, a control signal in response to the detecting of the one or more electrical transients; and imposing, by a controllable transient suppression unit based on the control signal, a load that has substantially the same impedance as a characteristic impedance associated with a part of the power system.

In yet another example aspect, a system for electrical transient protection includes a sensing means configured to monitor power transmission on a transmission line of a power system, a differentiating means configured to differentiate one or more electrical transients from a variation in the power transmission, a controlling means configured to generate a control signal in response to the one or more electrical transients detected by the sensing means, a driver means configured to generate a driving signal in response to the control signal, and a controller transient suppression means configured to impose a load on the power system in response to the driving signal. The load has substantially the same impedance as a characteristic impedance associated with a part of the power system.

The above and other aspects and features of the disclosed technology are described in greater detail in the drawings, the description and the claims.

BRIEF DESCRIPTION OF THE DRAWINGS

FIG. 11 is a flowchart representation of a method for protecting against electrical transients in accordance with one or more embodiments of the present technology.

DETAILED DESCRIPTION

Power line transients are undesirable and momentary in nature. For example, when current flowing through an inductive load is disrupted suddenly, the magnetic field associated with the current collapses, resulting in voltage impulses or voltage transients across the inductive load. The higher the rate of change of current, the larger the transient voltage spike can be. The transient voltage level typically is in the range of thousands of volts, which can severely damage devices connected to or near the same line.

Figure 1:
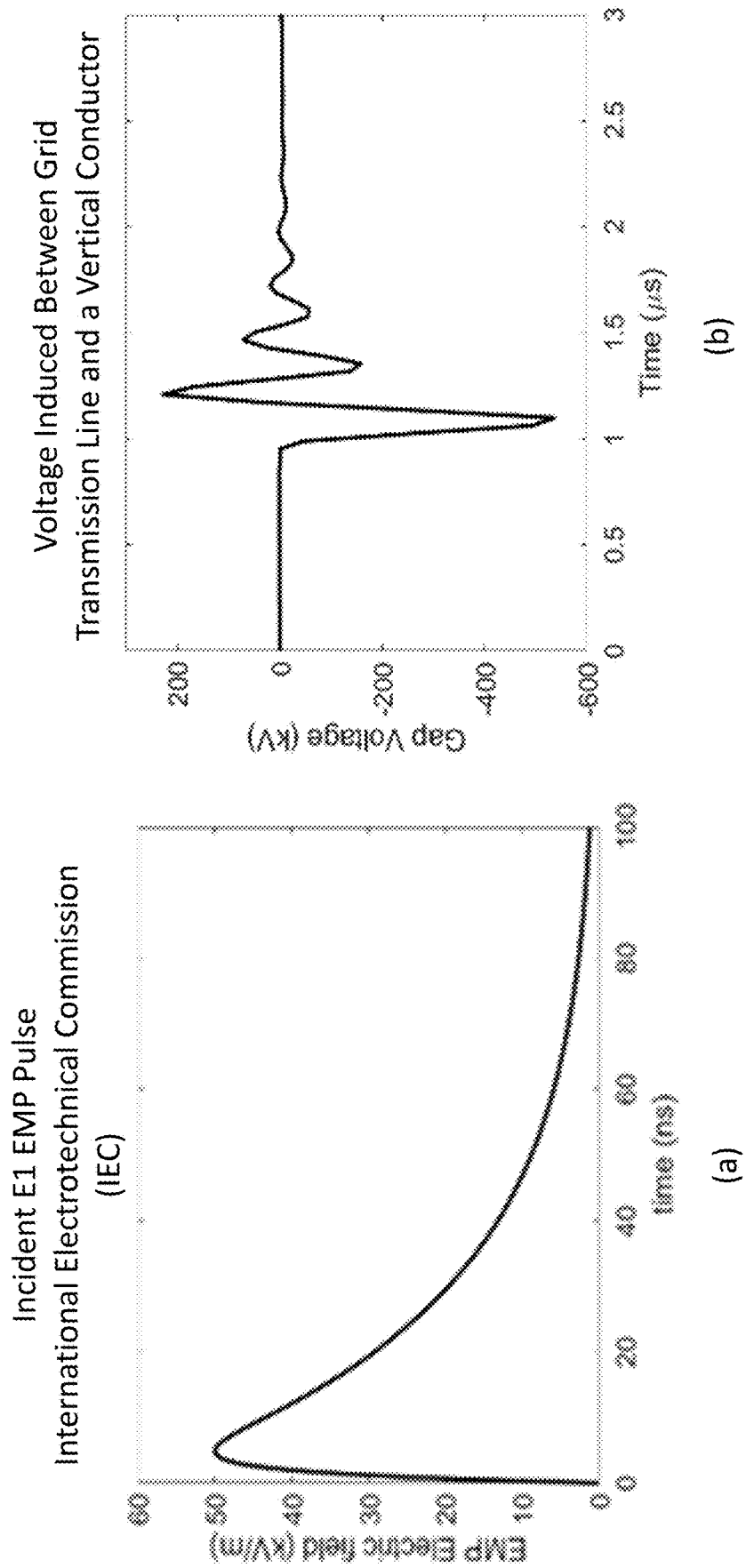
FIG. 1 illustrates an example electric field and gap voltage of an ultra-fast powerline transient.

Ultra-fast powerline transients induced by lightning, space events, or electromagnetic pulse can occur on nanosecond time scales, offering little time for the power grid system to react. The existing electrical power transmission and distribution grid is vulnerable to disruptions and damage when ultra-fast transients are induced and propagate. FIG. 1 illustrates an example electric field and gap voltage of an ultra-fast powerline transient. As shown in FIG. 1, the electric field can exceed 50 kV/m and the voltage induced by such transients can exceed 200 kV. These transients are so fast (e.g., ~10 to >100 ns) and the effects are so substantial that that conventional electronics are incapable of providing sufficient protection.

Furthermore, the electrical grid is highly interconnected with widely varying impedances in the various segments. The induced high voltage transients propagate along transmission and distribution lines. At connection points, there are likely to be impedance mismatches that result in the transient being reflected back into the line.

The characteristic impedance of a part of the power grid depends on the local geometry of the power grid (e.g., the elements at the nodes). Impedance is a measure of the opposition to electrical flow, represented by the symbol Z and measured in ohms. In the simplest situation, the characteristic impedance (also referred to as surge impedance) of a transmission line is the ratio of the amplitudes of voltage and current of a single wave propagating along the line. The ideal, but not realizable approach is to maintain a constant impedance throughout a power transmission system. If this approach could be constructed, fast transients would propagate unperturbed and would not multiply. But a power grid can be intrinsically modeled as a complex network including these transmission lines and various nodes, where at the nodes are either transformers, substations or generators, and similar devices. These elements at the nodes create boundary conditions that causes reflection of fast transients that continue to multiply and propagate.

Figure 2:
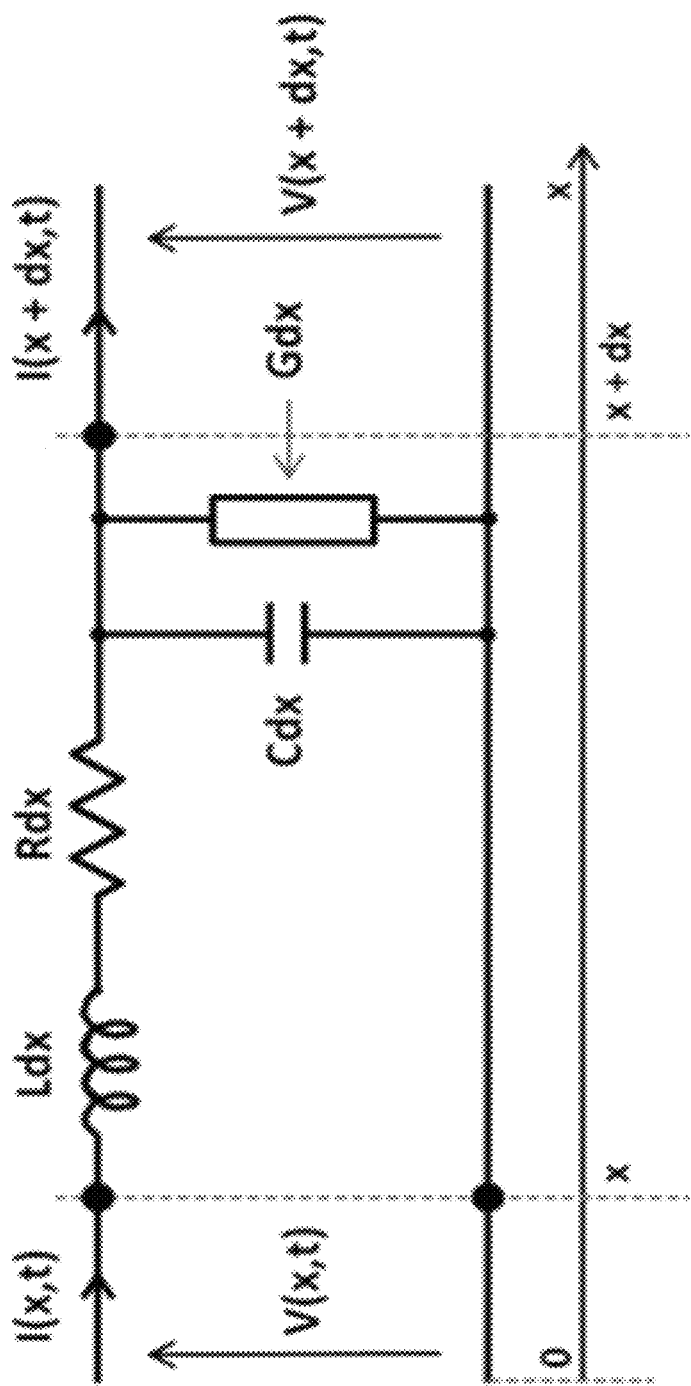
FIG. 2 illustrates an electrical equivalent circuit of a power transmission line in accordance with one or more embodiments of the present technology.

The characteristic impedance can impact power system reliability and the effectiveness of associated mitigation strategies. FIG. 2 illustrates an example configuration of electrical elements to facilitate the understanding of the disclosed technology. In FIG. 2, conductors are decomposed into example elements, where dx represents an infinitesimally small increment of a conductor. When ultra-fast transients occur, the resistance R can be considered as approximating 0 and the conductance G (i.e., the inverse of impedance) can be considered as approximating infinity. The wave needs to retain the original temporal characteristics, otherwise the wave's different frequency components begin to travel at different speeds. Ultra-fast transients have pulse widths that are much smaller than the distance $x=ct_{pulse}$ where c is the wave speed. The wave properties are thus dominated by the elements that define the characteristic impedance until a boundary impedance across the two terminals is encountered.

Figure 3A:
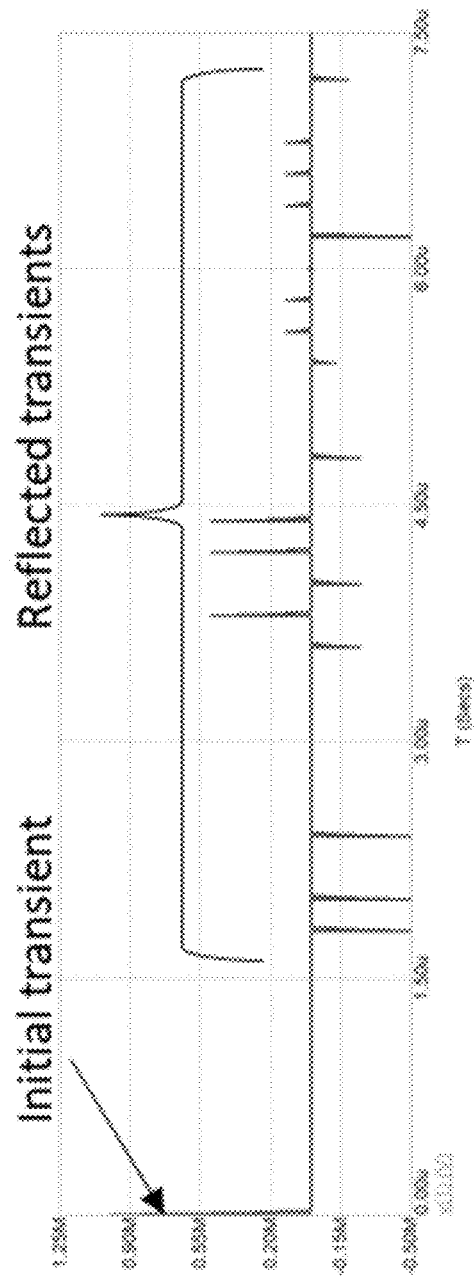
FIG. 3A illustrates an example of reflected transients in accordance with one or more embodiments of the present technology.

When the boundary impedance is lower than the characteristic impedance, a reflection is created of the opposite polarity. FIG. 3A illustrates an example of reflected transients to facilitate the understanding of the present technology. The transient is reflected with either the same polarity or the opposite polarity with an impedance mismatch. When the boundary impedance is equal to the characteristic impedance, no reflection is created. The transients are considered as "local" when the spikes are short (e.g., ~10 ns). When the resistance R and conductance G cause enough broadening and dispersion of the transients, the transients are "washed out" and are considered as non-local. For example, when width of a transient increases by approximately by a factor of 5 to 10 (e.g., from 10 ns to 50~100 ns), the transient is no longer local.

Figure 3B:
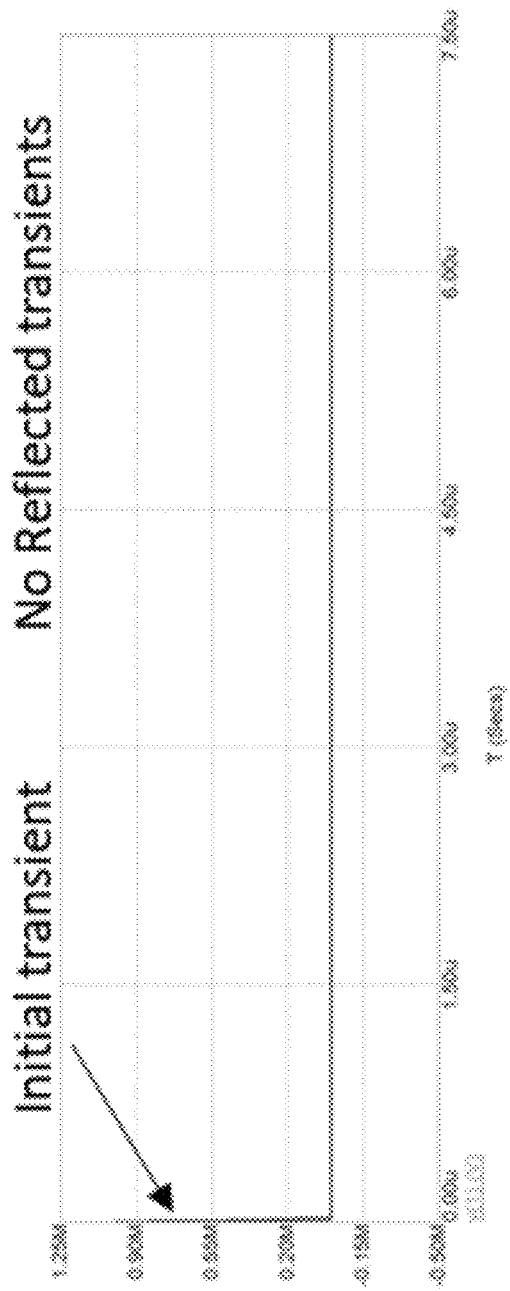
FIG. 3B illustrates an example of having no reflected transients in accordance with one or more embodiments of the present technology.

FIG. 3B illustrates an example of having no reflected transients in accordance with one or more embodiments of the present technology. In addition, because the grid system is naturally dispersive to fast transients, the fast transient can undergo pulse widening, making it easier to couple to the lower voltage side of the distribution grid. If left unchecked, these reflections can propagate throughout the power grid causing premature aging or triggering catastrophic breakdown in grid components. This can result in power outages in large portions of the grid and failures in customer connected loads.

In some cases, passive devices and threshold trigger devices may be implemented to protect against the transients. However, passive devices and threshold trigger devices are usually too slow and not easily tailorable to the varied transmission line impedances and can allow more transients to develop and propagate. For example, a simple crowbar can be positioned locally to shunt a high voltage transient for equipment protection, but the crowbar cannot prevent reflection and repropagation of transients because the impedance mismatch is not accounted for. Protection against induced fast transients can also be provided by surge protectors. These devices guard at a local level to protect equipment connected to the grid. They typically rely on metal oxide varistors (MOVs), avalanche diodes, or gas tubes to shunt the surge current. Although MOVs can react on the nanosecond time scale, avalanche diodes and gas tubes take more than 1 μs to react. For these devices, each activation degrades or destroys the protection device. Thus, their lifetime is limited and unless they are rigorously inspected and maintained, they can fail at a critical time resulting in damages or destructions of the equipment they are meant to protect. When transients are allowed to multiply and propagate on the grid, more surge protectors are triggered, leading to greater degradation and destruction.

Thus, there remains a need to implement a fast, controllable device that offers the required protection without generating further damaging transients in the grid and is readily adaptable to the varied impedances that can be encountered. This patent document discloses techniques that can be implemented in various embodiments to suppress ultra-fast transmission line transients that are in nanosecond time scale. Using the disclosed techniques, a module can be configured to present a matching impedance into a utility line within nanoseconds upon detection of a transient, thereby preventing reflection of the transient pulse and subsequent destruction of grid connected equipment. By preventing reflected transients, the disclosed techniques greatly reduce the degradation and destruction of surge protectors and the possibility of equipment damage.

Figure 4:
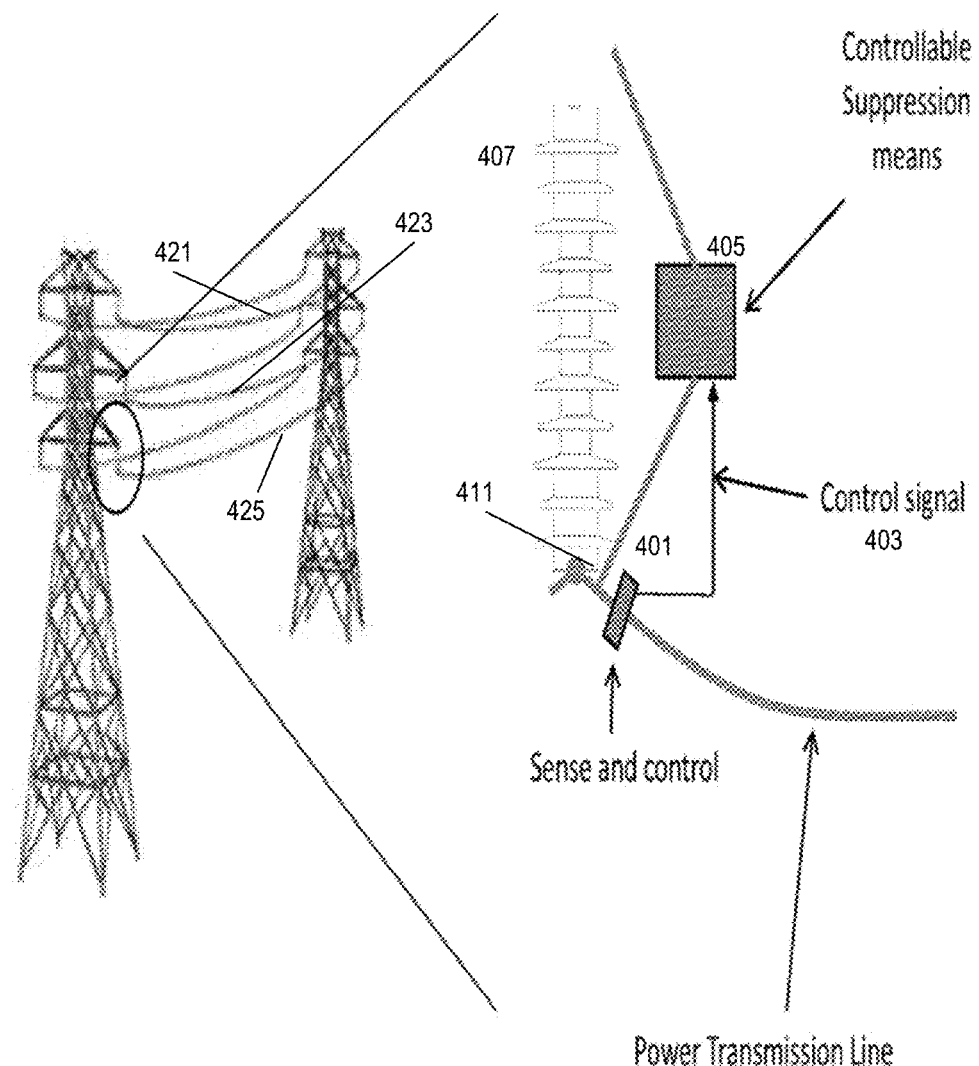
FIG. 4 illustrates an example configuration in accordance with one or more embodiments of the present technology.

FIG. 4 illustrates an example configuration 400 in accordance with one or more embodiments of the present technology. The example configuration includes a sensing means 401 coupled to the power transmission line to detect changes in the current, a controlling means (e.g., combined with the sensing means 401 in the depicted example) configured to receive the sensing results and generate a control signal, a means to transmit the control signal 403, and a controllable suppression means 405 configured to receive the control signal and imposes a load value on the transmission line. The load has substantially the same impedance as the characteristic impedance of the local geometry to terminate the transient. In some embodiments, the sensing means can be positioned close to the insulators 407 of the power lines.

In some embodiments, the controllable suppression means is in a parallel configuration with the power line(s) (e.g., from point 411 across the insulator 407 to another transmission line or the tower, which represents the ground). For example, in a three-phase power system as shown in FIG. 4, a controllable suppression means can be added between any of the two wires (e.g., wires 421 and 423, or wires 423 and 425, etc.) or between a wire and ground. Referring back to FIG. 2, the circuit in FIG. 2 can represent how each wire sees another wire or ground. Each wire represents a different voltage point and can have a voltage difference between adjacent wires and between the wire and the ground.

Figure 5:
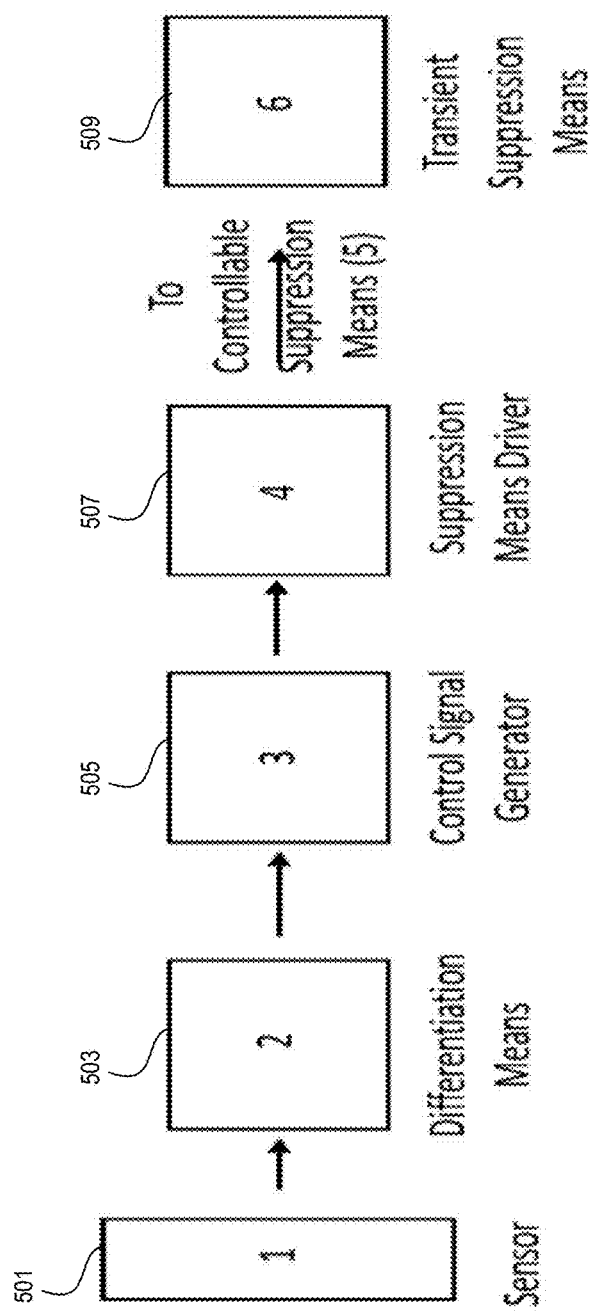
FIG. 5 is a schematic diagram of components of another example configuration in accordance with one or more embodiments of the present technology.

FIG. 5 is a schematic diagram of components of another example configuration 500 in accordance with one or more embodiments of the present technology. In some embodiments, the configuration is implemented using conventional electronic elements and semiconductors. In some embodiments, the configuration is implemented using photoconductive elements, such as an Optical Transconductance Varistor (OTV) that is discussed in detail in connection with FIGS. 7A-7B below, to take advantage of the isolation afforded by photonic control.

The example configuration in FIG. 5 includes a sensing means or a sensor 501 configured to monitor power transmission through a power line. Examples of the sensing means include at least the following: a fast Rogowski coil (e.g., both self-integrating and/or differentiating type), a Hall-probe sensor for current, a lumped element (e.g., capacitive, resistive, etc.) voltage divider, a toroidal current transformer, a Pockel's effect field sensor (e.g., using fiber optic coupling), and/or a Kerr effect field sensor (e.g., using fiber optic coupling).

In some embodiments, the configuration includes a differentiation means 503 (e.g., either standalone or combined with the sensor) configured to differentiate a destructive transient from normal variations in the power lines. Examples of the differentiation means include at least the following: a series zener diode, a summing amplifier in combination with a reference source, a fast analog computer, a fast analog waveform comparator, a configurable bandpass amplifier, and/or non-linear optical absorbers used in conjunction with optical sensors.

The configuration also includes a control signal generator 505 configured to generate a control signal in response the destructive transient. Additional examples of the control signal generator include at least the following: an electrical amplifier, a Schmidt trigger generator, a triggerable function generator, and/or an optical amplifier. A suppression means driver 507 receives the control signal (e.g., an electrical signal) and generates a driving signal (e.g., an optical signal) to drive and control the transient suppression means 509. The transient suppression means 509 is configured to generate a load that has substantially the same impedance as the characteristic impedance determined based on the local geometry of the power grid/system. Examples of the suppression means driver include at least the following: an optical source such as a laser diode array, a long pulse Nd:YAG laser and amplitude modulator, and/or LEDs with an optical concentrator. Examples of transmission means from the suppression means driver to the suppression means include but not limited to direct abutment to the "Suppression means driver," an optical fiber, and/or direct lensing transport. Examples of a controllable transient suppression means include at least a photonically responsive material such as semi-insulating SiC, a wideband gap switch with an optional resistor, non-wideband gap switch such Si with a resistor.

Figure 6:
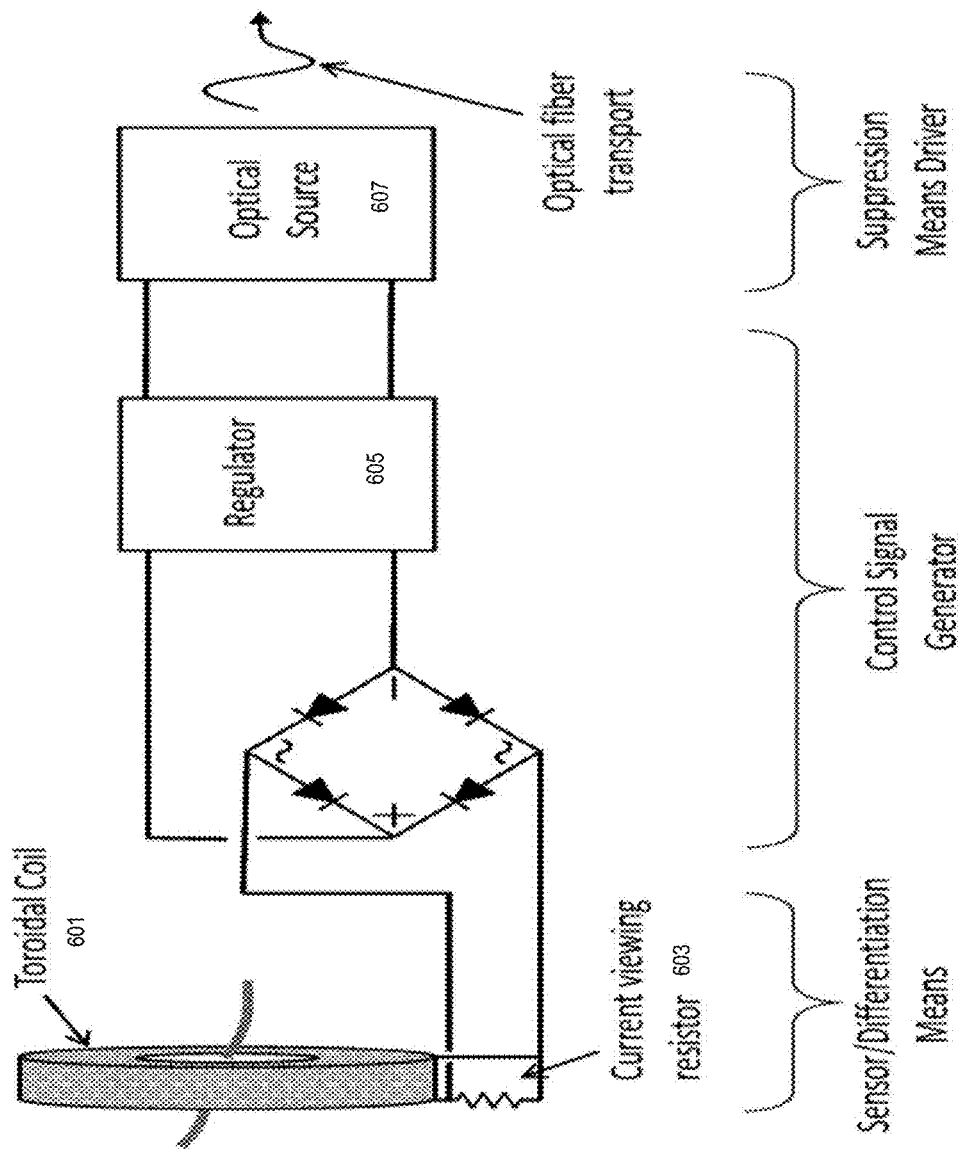
FIG. 6 illustrates an example implementation of a transient suppressing device in accordance with the one or more embodiments of the present technology.

FIG. 6 illustrates an example implementation of a transient suppressing device in accordance with the one or more embodiments of the present technology. In this example implementation, the sensor and the differentiation means are combined and implemented using a current transformer. In some embodiments, the combined sensing and differentiation means includes a toroidal coil 601 and a resistor 603. The toroidal coil can detect the variation of current in the power line that goes through its center. The toroidal coil 601 and the resistor 603 are configured to distinguish a destructive transient from normal variations of current by neglecting slowly varying power fluctuations (e.g., making the Inductance (L) and Resistance (R) ratio sufficiently small). For example, a normal variation can be within ±10% range of the expected voltage. A range that exceeds the ±10% range can be deemed as transients. As another example, when the rate of rise (e.g., a change of voltage within a ns or a μs) exceeds a predefined threshold, the variation can be categorized as transients.

In some embodiments, the control signal generator comprises an analog regulator 605, e.g., a laser diode array. The output of the combined sensing and differentiation means is rectified and controlled by the analog regulator 605 to generate a control signal that controls an operation of the suppression means driver (e.g., an optical source 607). The optical source 607 then generates a driving signal (e.g., an optical signal) that is transported via the optical fiber to drive and control the transient suppression means.

Figure 7A:
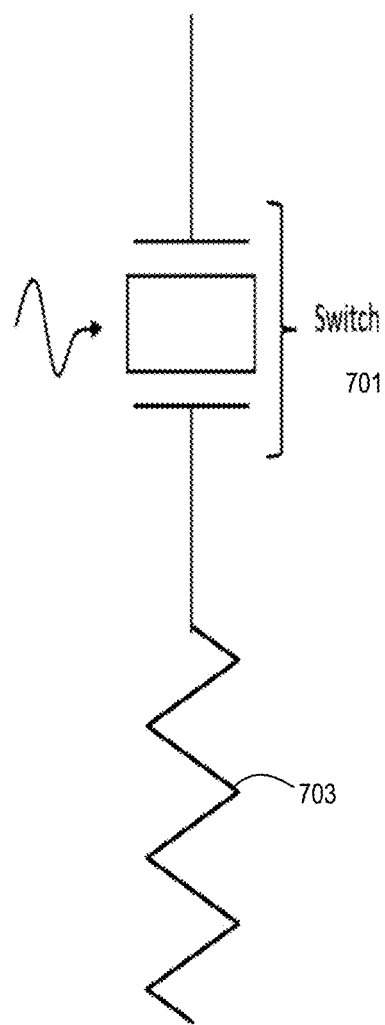
FIG. 7A illustrates an example implementation of a transient suppression means in accordance with one or more embodiments of the present technology.

FIG. 7A illustrates an example implementation of a transient suppression means in accordance with one or more embodiments of the present technology. In this example, the transient suppression means includes a switch 701 and a resistor 703. The resistor has a load that has substantially the same impedance as the characteristic impedance of a part of the power system. For example, the characteristic impedance can be predetermined based on the local geometry of the grid system (e.g., the configurations of the nodes and edges). A resistor having a similar load value then can be deployed in the transient suppression means. Upon a detection of the transient, the switch 701 closes and the load is introduced into the transmission line so as to prevent reflection of the transient pulse and subsequent destruction of grid connected equipment.

Figure 7B:
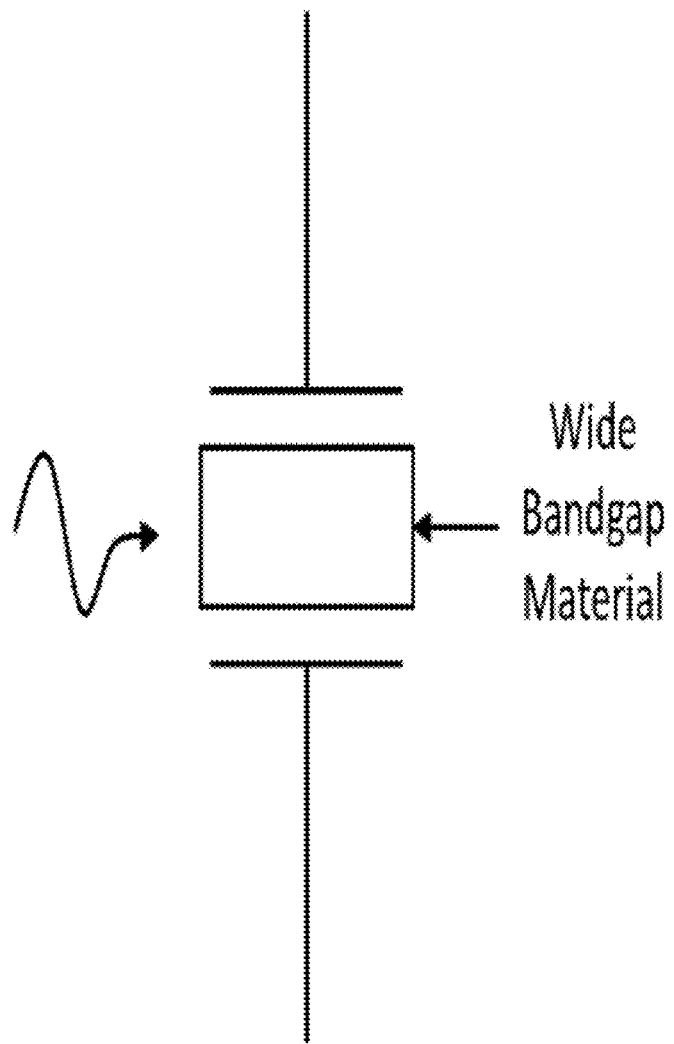
FIG. 7B illustrates another example transient suppression means in accordance with one or more embodiments of the present technology.

FIG. 7B illustrates another example transient suppression means in accordance with one or more embodiments of the present technology. In this example, the transient suppression means comprises a linearly controlled Optical Transconductance Varistor (OTV). The OTV is a new class of photoconductive switch that relies on specially doped, semi-insulating silicon carbide. The OTV's conductivity is linearly proportional to incident light intensity. Optical control of the OTV excites carriers in the bulk of the material simultaneously so that the turn-on time is at the speed of carrier transition from the mid-bandgap to the conduction state in less than a nanosecond. The turn-off time is a function of recombination effects and occurs on the order of a nanosecond. The OTV has been demonstrated to block>20 kV at 0.5 mm thick, have rise and fall times of ~10 ns dependent on the light source and driver, conduct kA's and operate at >125 kHz. Details regarding the OTV are further described in U.S. Pat. No. 11,366,401, the content of which is incorporated by reference in its entirety.

Figure 8A:
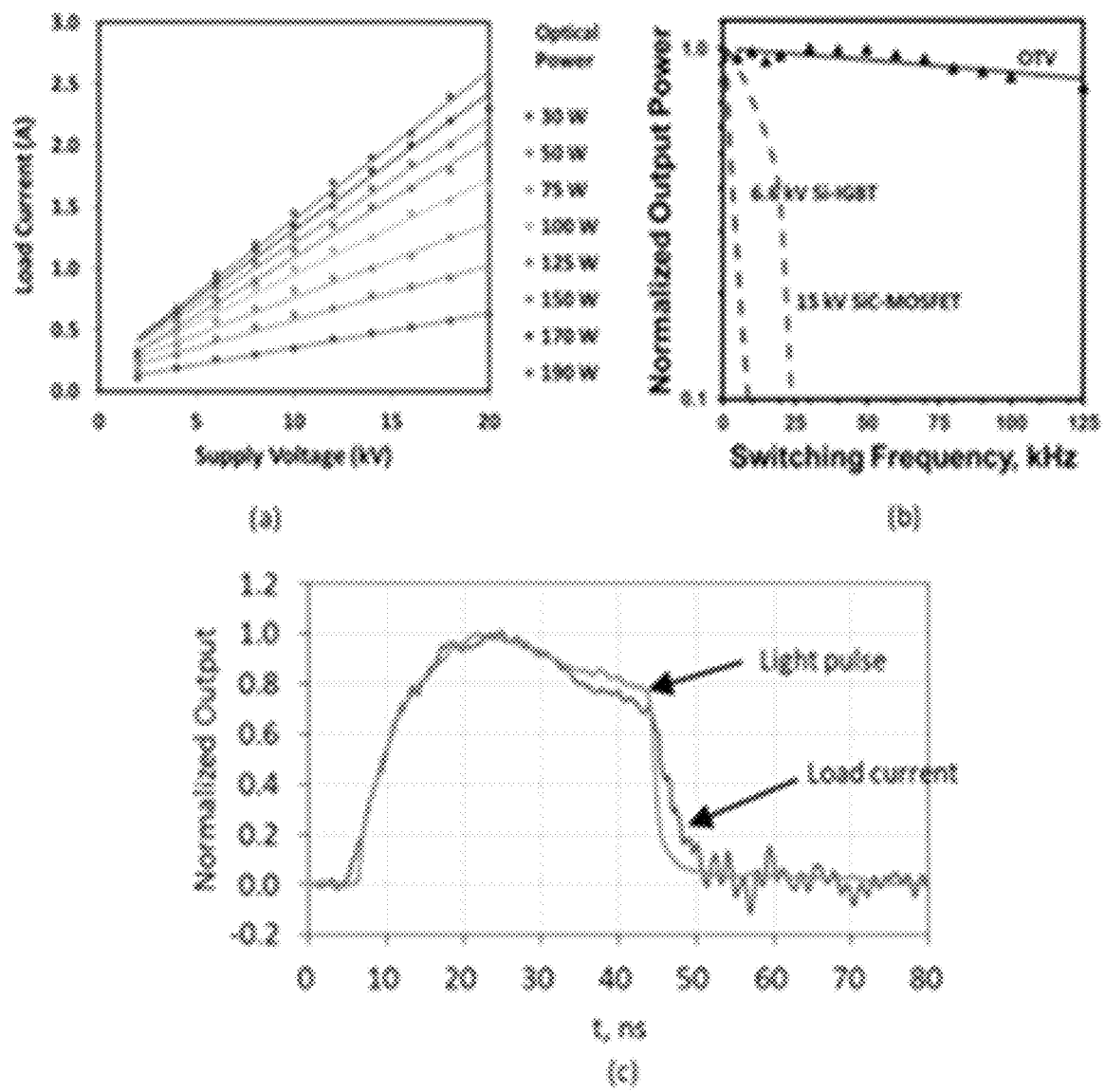
FIG. 8A illustrates the linear transconductance like behavior of an example Optical Transconductance Varistor (OTV).

By taking advantage of the OTV's linear response to incident light intensity, its on-state impedance can be tailored to match that of a transmission or distribution line. By controlling the intensity of light incident on the SiC switch material, conductivity, and thus impedance, can be controlled. The optical power output of laser diodes, for example, can be controlled by the supply voltage and current. Setting the light source input to a prescribed value can provide a specified optical output and a desired impedance of the OTV. FIG. 8A illustrates the linear transconductance like behavior of an example OTV given the supply voltage.

The use of the OTV allows adaptive deployment of the transient suppression means, as the resistance/load value of the OTV is determined by the transconductance like optical properties. The example shown in FIG. 7B can be deployed and/or re-deployed in different types and/or parts of the power system as its output load is adjustable based on the supplied voltage and/or current.

Figure 8B:
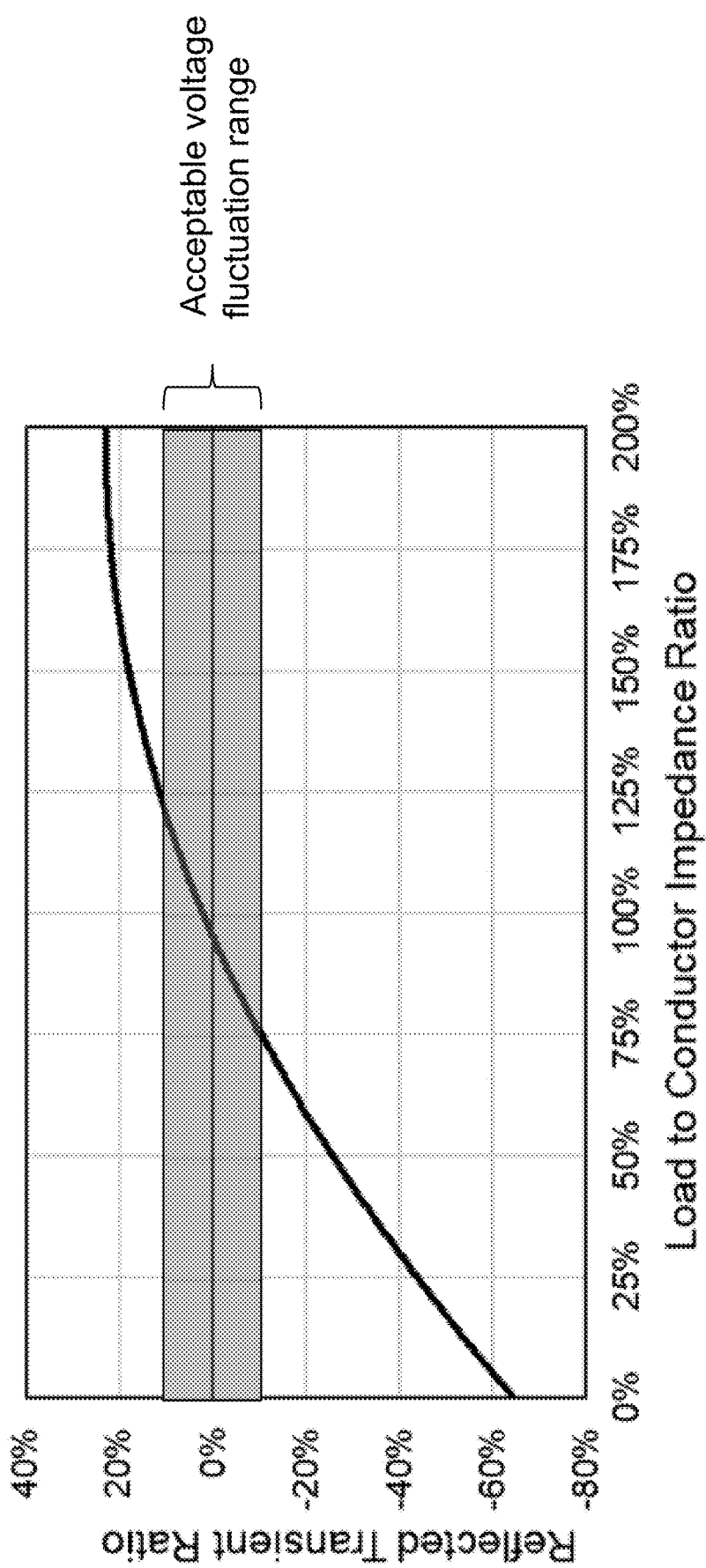
FIG. 8B illustrates an example impedance ratio to reflected transient ratio in accordance with one or more embodiments of the present technology.

FIG. 8B illustrates an example impedance ratio to reflected transient ratio in accordance with one or more embodiments of the present technology. Experimentation has shown that the impedance generated by the OTV (or other implementations of the switch) can be from 75% to 125% of the transmission line impedance and still reduce the transient voltage to within 10% of the nominal voltage.

Figure 9:
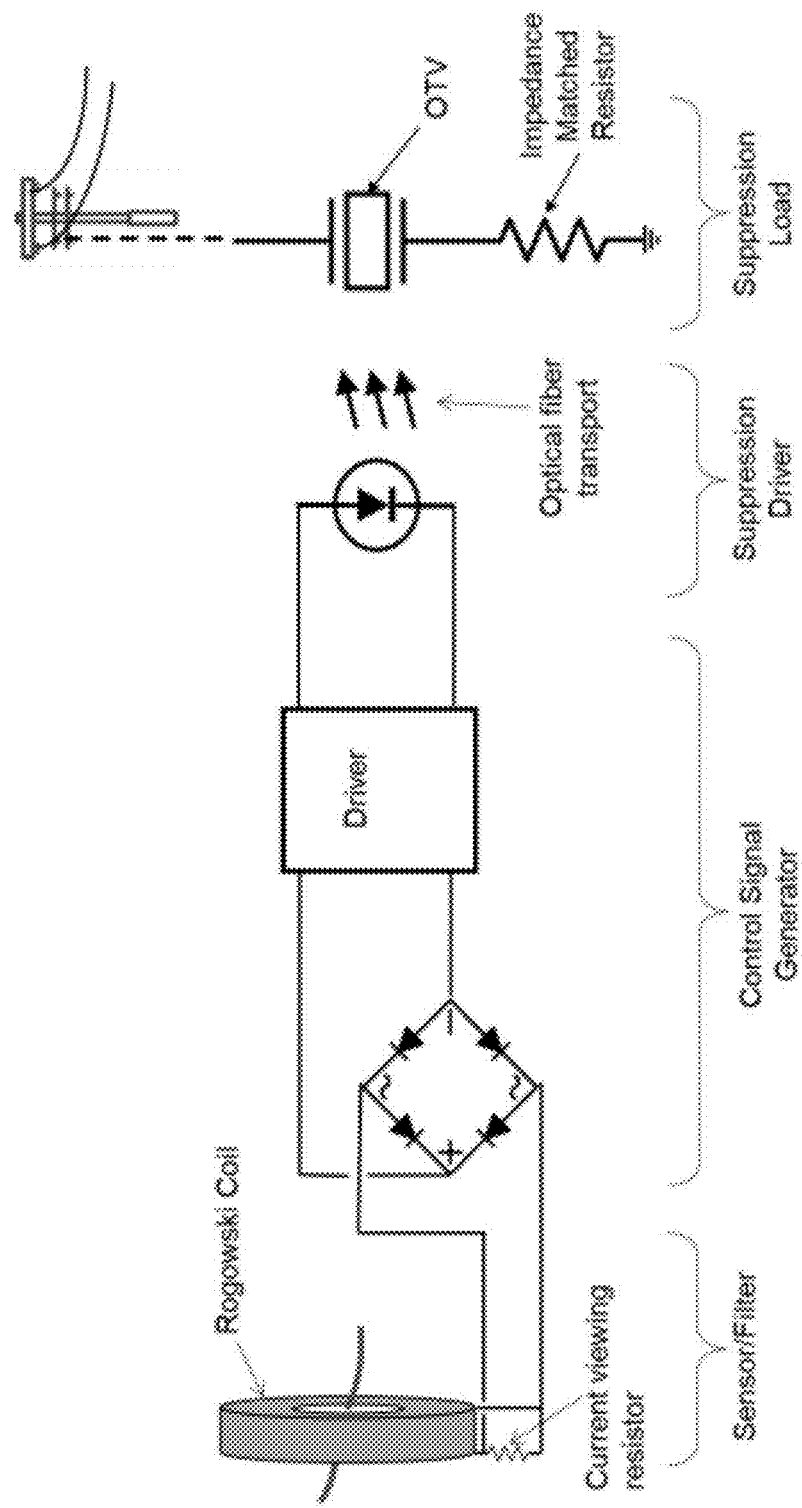
FIG. 9 illustrates an example configuration in accordance with one or more embodiments of the present technology.

FIG. 9 illustrate an example configuration in accordance with one or more embodiments of the present technology. In this example, a current sensor such as a Rogowski coil can act as both the transient sensor and to trigger the laser diode optical source that drives the OTV. By varying the winding pitch, minor and major loop diameter, and current viewing resistor, the Rogowski coil can be designed to output a wide range of voltages from several volts to as much multiple hundreds of volts with tailored bandwidth capability into the GHz response regime. In some embodiments, when excited uniformly, there exhibits no intrinsic delay. In this example approach, the rectified pulse from the Rogowski coil is used to trigger a driver for the optical source which turns the OTV on for the transient pulse width. Delay from driver trigger input, through an example laser diode driver and until approximately 70 W optical output, is about 13 ns. In one specific implementation, four laser diode drivers/laser diode modules are used to turn the OTV fully on. This action terminates the transient into a surge impedance equal to that of the power transmission line, preventing creation of damaging reflections Eliminating the resistor allows the module to function as a standard clamping device. The drive circuitry is analog with no microprocessor or other digital control. In this example, the impedance can be predetermined using superposition.

Figure 10:
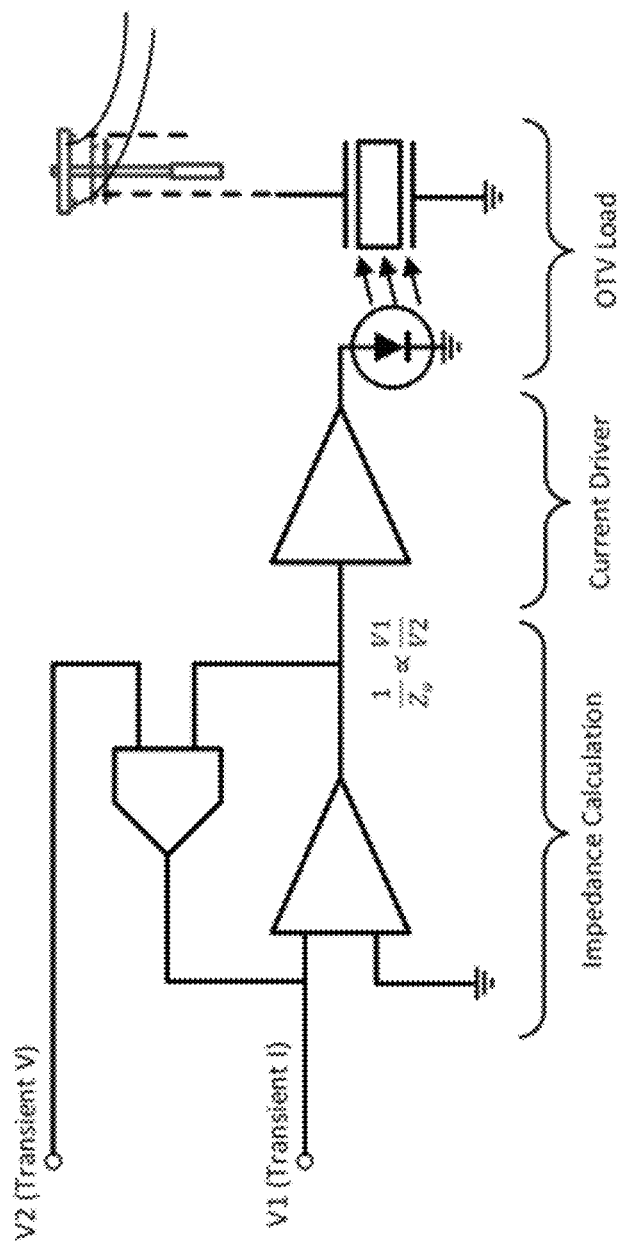
FIG. 10 illustrates another example configuration in accordance with one or more embodiments of the present technology.

FIG. 10 illustrates another example configuration in accordance with one or more embodiments of the present technology. This example configuration can be implemented to enable real-time measurement of the current/voltage and the adaptive change of the on resistance of the OTV in order to produce the matching impedance. In particular, an analog computing approach can be used to calculate the impedance and to provide the proper optical drive to the OTV for loading of the transmission line. Here, the linear dynamic range of the OTV is used to autonomously set the proper termination impedance. By using time isolation and measuring the first propagating term in the series expansion, the transmission line surge impedance can be immediately known using Rogowski coils to measure current and electric field sensors to measure voltage. By calculating the ratio of current to voltage and using a scaling factor, optical drive for the OTV is generated to set the termination resistance. Typical values for the propagation delay for ultra-fast commercial analog components in FIG. 10 are 0.7 to 4 ns. With these components, the throughput delay can be on the order of 17 ns, making the system suitable for a defense against the transient induced by the International Electrotechnical Commission (IEC) E1 pulse. Furthermore, in this example configuration, power dissipation can be contained completely within the OTV. Taking the example of approximately 100 J and a Full Width at Half Maximum (FWHM) of 200 ns, for a 1 mm thick substrate with a 1 $cm^2$ conductive area, a peak power density of $5 \times 109$ J-$cm^{-3}$ occurs. A greater factor of safety can be implemented by increasing the conductive area of the device. Using the example configuration shown in FIG. 10, the power grid protection system can properly handle consecutive transients, especially when the system impedance changes between the consecutive transients.

FIG. 11 is a flowchart representation of a method for protecting against electrical transients in accordance with one or more embodiments of the present technology. The method 1100 includes, at operation 1110, detecting, by a sensor coupled to a transmission line of a power system, one or more electrical transients that are different from a variation in power transmission of the power system. The method 1100 includes, at operation 1120, generating, by a controller that is coupled to the sensor, a control signal in response to the detecting of the one or more electrical transients. The method also includes, at operation 1130, imposing, by a controllable transient suppression unit based on the control signal, a load to the power system. The load has substantially the same impedance as a characteristic impedance associated with a part of the power system.

In some embodiments, the method includes distinguishing between the one or more transients from the variation by reducing an Inductance and Resistance ratio of the sensor. In some embodiments, the controller comprises a laser diode array and the control signal comprises an optical signal. In some embodiments, the imposing of the load includes closing a switch of the controllable transient suppression unit in response to the control signal. In some embodiments, the method further includes supplying a voltage to the controllable transient suppression unit such that the load has substantially the same impedance as the characteristic impedance associated with a part of the power system.

A comparison between the conventional surge protection devices with an example embodiment implemented using the disclosed techniques is shown in Table 1 below. As shown in Table 1, the example embodiment implemented using the disclosed techniques can achieve much higher voltage rating (the maximum allowable voltage of the circuit where the embodiment is used for different loads). In some cases, the voltage rating exceeds 20 kV. The example embodiment can also achieve a small rise time (the time in which the switch goes from an OFF state to an ON state) that is around 1 ns. The voltage and current slew rates are higher than the conventional technology, indicating the short rise/fall time that can be achieved using the disclosed technology. Furthermore, a much longer lifetime (e.g., around 30,000 cycles) can be provided as compared to the conventional techniques. For example, example devices have been operated for multi-million switching cycles with no evidence of degradation.

TABLE 1

Comparison of Surge Protection devices with
Disclosed Transient Suppression Device

| Parameter | MOV | Avalanche Diode | Gas Switch | Example Device |
|---|---|---|---|---|
| Voltage Rating (kV) | 4.7 | 5.3 | 7.5 | >20 kV |
| Current Rating-Peak (A) | 70,000 | 50 | 20,000 | >2500 |
| Rise time | ~1 ns | 1 μs | 5 μs | ~1 ns |
| Voltage Slew Rate (V/ns) | <1 | | 2 | >500 |
| Current Slew Rate (A/ns) | <10 | <1 | 5 | >200 |
| Lifetime (cycles) | 1000 @ 100 A | 50 @ 50 A | 20 @ 20 kA | 30,000 |

Some preferred embodiments according to the disclosed technology adopt the following solutions.

1. An electrical transient protection device, comprising: a sensor configured to monitor power transmissions on a transmission line of a power system, and to detect one or more electrical transients on the transmission line; a controller coupled to the sensor and configured to generate a control signal in response to detection of the one or more electrical transients; and a controllable transient suppression unit coupled to the controller and comprising at least a switch that exhibits a changeable impedance, the controllable transient suppression unit configured to impose a load on the power system, wherein the load has substantially the same impedance as a characteristic impedance associated with a part of the power system.

2. The electrical transient protection device of solution 1, wherein the load impedance is in a range between 75% to 125% of the characteristic impedance associated with a part of the power system.

3. The electrical transient protection device of solution 1 or 2, wherein the sensor comprises a differentiator configured to differentiate a transient from a variation in the power transmissions.

4. The electrical transient protection device of any of solutions 1 to 3, wherein the sensor comprises at least one of a current transformer, a toroidal coil and a resistor, a fast Rogowski coil, a Hall-probe sensor for current, a voltage divider, a toroidal current transformer, a Pockel's effect field sensor, or a Kerr effect field sensor.

5. The electrical transient protection device of any of solutions 1 to 4, wherein the sensor is positioned in proximity to the transmission line and is configured to produce a signal for the controllable transient suppression unit in response to the one or more electrical transients.

6. The electrical transient protection device of any of solutions 1 to 5, wherein the controller comprises at least an analog regulator, an electrical amplifier, a Schmidt trigger generator, a triggerable function generator, or an optical amplifier.

7. The electrical transient protection device of any of solutions 1 to 6, wherein the controller comprises a laser diode array, and wherein the control signal comprises an optical signal that is used to operate the switch.

8. The electrical transient protection device of solution 7, wherein the switch comprises an optical device configured to turn on/off based on the optical signal from the laser diode array.

9. The electrical transient protection device of any of solutions 1 to 8, wherein the switch is configured to exhibit a linear transconductance behavior such that the load associated with the switch has a linear correlation with a supplied voltage.

10. The electrical transient protection device of any of solutions 1 to 9, wherein the controllable transient suppression unit further comprises a resistor having the load that has a substantially same impedance as the characteristic impedance associated with the part of the power system.

11. A method for protecting against electrical transients, comprising: detecting, by a sensor coupled to a transmission line of a power system, one or more electrical transients that are different from a variation in power transmission of the power system; generating, by a controller that is coupled to the sensor, a control signal in response to the detecting of the one or more electrical transients; and imposing, by a controllable transient suppression unit based on the control signal, a load to the power system, wherein the load has a substantially same impedance as a characteristic impedance associated with a part of the power system.

12. The method of solution 11, comprising: distinguishing between the one or more electrical transients from the variation upon detecting a change of a voltage value that exceeds 100% of an expected voltage or a rate of voltage rise that exceeds a predefined threshold, wherein the rate of voltage rise is measured using a change of voltage within a specified time duration.

13. The method of solution 11 or 12, wherein the controller comprises a laser diode array, and wherein the control signal comprises an optical signal.

14. The method of any of solutions 11 to 13, wherein the imposing of the load comprises: closing a switch of the controllable transient suppression unit in response to the control signal.

15. The method of solution 14, further comprising: supplying a voltage to the controllable transient suppression unit such that the load has a substantially same impedance as the characteristic impedance associated with the part of the power system.

16. A system for electrical transient protection, comprising: a resistor and a coil configured to monitor power transmission on a transmission line of a power system and to differentiate one or more electrical transients from a variation in the power transmission; an analog regulator configured to generate a control signal in response to the one or more electrical transients detected by the resistor and the coil; a laser diode array configured to generate a driving signal in response to the control signal; and a controllable photoconductive switch configured to impose a load on the power system in response to the driving signal, wherein the load has a substantially same impedance as a characteristic impedance associated with a part of the power system.

17. The system of solution 16, wherein the controllable photoconductive switch is configured to exhibit a changeable impedance.

18. The system of solution 16 or 17, wherein the impedance of the load is in a range between 75% to 125% of the characteristic impedance associated with a part of the power system.

19. The system of any of solutions 16 to 18, wherein the resistor and the coil are configured to detect the one or more electrical transients based on a change of a voltage value that exceeds 100% of an expected voltage or a rate of voltage rise that exceeds a predefined threshold, wherein the rate of voltage rise is measured using a change of voltage within a specified time duration.

20. The system of any of solutions 16 to 19, wherein the controllable photoconductive switch comprises a wide bandgap material.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. An electrical transient protection device, comprising:
   a sensor configured to monitor power transmissions on a transmission line of a power system, and to detect one or more electrical transients on the transmission line;
   a controller coupled to the sensor and configured to generate a control signal in response to detection of the one or more electrical transients; and
   a controllable transient suppression unit coupled to the controller and comprising at least a switch that exhibits a changeable impedance, the controllable transient suppression unit configured to impose a load on the power system, wherein the load has an impedance that is substantially same as a characteristic impedance associated with a part of the power system, wherein the controller comprises a laser diode array, and wherein the control signal comprises an optical signal that is used to operate the switch.

2. The electrical transient protection device of claim 1, wherein the impedance of the load is in a range between 75% to 125% of the characteristic impedance associated with a part of the power system.

3. The electrical transient protection device of claim 1, wherein the sensor comprises a differentiator configured to differentiate a transient from a variation in the power transmissions.

4. The electrical transient protection device of claim 1, wherein the sensor comprises at least one of a current transformer, a toroidal coil and a resistor, a fast Rogowski coil, a Hall-probe sensor for current, a voltage divider, a toroidal current transformer, a Pockel's effect field sensor, or a Kerr effect field sensor.

5. The electrical transient protection device of claim 1, wherein the sensor is positioned in proximity to the transmission line and is configured to produce a signal for the controllable transient suppression unit in response to the one or more electrical transients.

6. The electrical transient protection device of claim 1, wherein the controller comprises at least an analog regulator, an electrical amplifier, a Schmidt trigger generator, a triggerable function generator, or an optical amplifier.

7. The electrical transient protection device of claim 1, wherein the switch comprises an optical device configured to turn on/off based on the optical signal from the laser diode array.

8. The electrical transient protection device of claim 1, wherein the switch is configured to exhibit a linear transconductance behavior such that the impedance of the load associated with the switch has a linear correlation with a supplied voltage.

9. The electrical transient protection device of claim 1, wherein the controllable transient suppression unit further comprises a resistor having the load that has a substantially same impedance as the characteristic impedance associated with the part of the power system.

10. A method for protecting against electrical transients, comprising:
    detecting, by a sensor coupled to a transmission line of a power system, one or more electrical transients that are different from a variation in power transmission of the power system;
    generating, by a controller that is coupled to the sensor, a control signal in response to the detecting of the one or more electrical transients; and
    imposing, by a controllable transient suppression unit based on the control signal, a load to the power system, wherein the load has an impedance that is substantially same as a characteristic impedance associated with a part of the power system, wherein the controller comprises a laser diode array, and wherein the control signal comprises an optical signal.

11. The method of claim 10, comprising:
    distinguishing between the one or more electrical transients from the variation upon detecting a change of a voltage value that exceeds 100% of an expected voltage or a rate of voltage rise that exceeds a predefined threshold, wherein the rate of voltage rise is measured using a change of voltage within a specified time duration.

12. The method of claim 10, wherein the imposing of the load comprises:
    closing a switch of the controllable transient suppression unit in response to the control signal.

13. The method of claim 12, further comprising:
    supplying a voltage to the controllable transient suppression unit such that the impedance of the load is substantially same as the characteristic impedance associated with the part of the power system.

14. A system for electrical transient protection, comprising:
    a resistor and a coil configured to monitor power transmission on a transmission line of a power system and to differentiate one or more electrical transients from a variation in the power transmission;
    an analog regulator configured to generate a control signal in response to the one or more electrical transients detected by the resistor and the coil;
    a laser diode array configured to generate a driving signal in response to the control signal; and
    a controllable photoconductive switch configured to impose a load on the power system in response to the driving signal, wherein the load has an impedance that is substantially same as a characteristic impedance associated with a part of the power system.

15. The system of claim 14, wherein the controllable photoconductive switch is configured to exhibit a changeable impedance.

16. The system of claim 14, wherein the impedance of the load is in a range between 75% to 125% of the characteristic impedance associated with a part of the power system.

17. The system of claim 14, wherein the resistor and the coil are configured to detect the one or more electrical transients based on a change of a voltage value that exceeds 100% of an expected voltage or a rate of voltage rise that exceeds a predefined threshold, wherein the rate of voltage rise is measured using a change of voltage within a specified time duration.

18. The system of claim 14, wherein the controllable photoconductive switch comprises a wide bandgap material.

* * * * *